United States Patent
Folchert

(10) Patent No.: US 7,032,895 B2
(45) Date of Patent: *Apr. 25, 2006

(54) CLOSED LEVEL CONTROL SYSTEM FOR A VEHICLE WITH THE SYSTEM HAVING TWO PRESSURE STORES

(75) Inventor: Uwe Folchert, Lauenau (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/616,994

(22) Filed: Jul. 11, 2003

(65) Prior Publication Data

US 2004/0026835 A1 Feb. 12, 2004

(30) Foreign Application Priority Data

Jul. 11, 2002 (DE) ............................... 102 31 251

(51) Int. Cl.
*F16F 9/43* (2006.01)
*B60G 17/01* (2006.01)

(52) U.S. Cl. ............................... 267/64.28; 280/5.514; 280/124.16

(58) Field of Classification Search .............. 267/64.16, 267/64.28; 280/124.104, 124.106, 124.157, 280/124.158, 124.159, 124.16, 124.161, 280/5.514

See application file for complete search history.

(56) References Cited

U.S. PATENT DOCUMENTS

| 4,015,859 | A | * | 4/1977 | Hegel et al. .............. 267/64.16 |
| 4,834,418 | A | | 5/1989 | Buma et al. ................. 280/707 |
| 4,858,895 | A | * | 8/1989 | Buma et al. .............. 267/64.16 |
| 5,205,322 | A | * | 4/1993 | Merick et al. ............... 137/597 |
| 6,098,967 | A | * | 8/2000 | Folchert ................... 267/64.16 |
| 6,116,586 | A | * | 9/2000 | Westerkamp et al. .... 267/64.28 |
| 6,354,617 | B1 | * | 3/2002 | Behmenburg et al. .................... 280/124.157 |
| 6,726,189 | B1 | * | 4/2004 | Folchert et al. ........... 267/64.16 |
| 2001/0004443 | A1 | | 6/2001 | Behmenburg et al. ... 267/64.28 |
| 2002/0136645 | A1 | | 9/2002 | Folchert et al. .......... 267/64.16 |

FOREIGN PATENT DOCUMENTS

EP 1243447 A2 * 9/2002

* cited by examiner

*Primary Examiner*—Melody M. Burch
(74) *Attorney, Agent, or Firm*—Walter Ottesen

(57) ABSTRACT

In a closed level control system for vehicles, a vehicle body is suspended relative to at least one vehicle axle. The level control system includes pressurized medium chambers, a compressor, an air dryer and a pressurized medium supply vessel which is partitioned into first and second pressurized medium spaces. The two pressurized medium spaces have no direct connection. Either the first pressurized medium space or the second pressurized medium space can be connected to the compressor input or the compressor output via at least one common controllable directional valve so that the pressurized medium from the pressurized medium chambers can be transferred into the first or into the second pressurized medium space or pressurized medium can be transferred from the first or the second pressurized medium space into the pressurized medium chambers.

8 Claims, 3 Drawing Sheets

CLOSED LEVEL CONTROL SYSTEM FOR A VEHICLE WITH THE SYSTEM HAVING TWO PRESSURE STORES

FIELD OF THE INVENTION

The invention relates to a closed level control system for a vehicle in which the vehicle body is suspended relative to at least one vehicle axle.

BACKGROUND OF THE INVENTION

A closed level control system for vehicles of the above type is disclosed in U.S. Pat. No. 6,726,189. The level control system shown in this patent includes two or four controllable directional valves, a pressurized medium supply vessel and at least two pressurized medium chambers having respective controllable directional valves. With this level control system, a pressurized medium from the pressurized medium chambers can be transferred into the pressurized medium supply vessel or vice versa. Furthermore, air from the atmosphere can be transferred into the pressurized medium supply vessel. The compressed air is dried in an air dryer before entry thereof into the pressurized medium supply vessel. To regenerate the air dryer, pressurized medium from the pressurized medium supply vessel can be expanded via a throttle and, in comparison to air drying, be conducted in the opposite direction through the air dryer via a relief valve to the atmosphere. With this level control system, no abrupt different control speeds can be achieved as is desirable and required for specific application purposes.

U.S. Pat. No. 4,834,418 discloses a closed level control system for a vehicle and includes: a compressor, an air dryer, an intake valve, a discharge valve, two low-pressure pressurized medium supply vessels and two high-pressure pressurized medium supply vessels. The low-pressure and high-pressure pressurized medium supply vessels are connected via respective directional valves to the compressor input or the compressor output. Likewise, pressurized medium supply chambers are connected via controllable directional valves to the compressor input or the compressor output. The pressurized medium chambers can be connected to the low-pressure pressurized medium supply vessels or the high-pressure pressurized medium supply vessels via controllable directional valves so that pressurized medium can be exchanged in accordance with the pressure drop. With the level control system, pressurized medium can be transferred from the low-pressure pressurized medium supply vessels or the pressurized medium chambers by the compressor into the high-pressure pressurized medium supply vessels. A transfer of pressurized medium from the high-pressure pressurized medium supply vessel into the low-pressure pressurized medium supply vessel or the pressurized medium chambers with the compressor is not possible notwithstanding the complex configuration with many controllable directional valves.

SUMMARY OF THE INVENTION

It is an object of the invention to provide a closed level control system for vehicles which has a simple configuration and does not take up much space and permits abrupt different control speeds.

The closed level control system of the invention is for a vehicle having a vehicle body, vehicle axles and pressurized medium chambers with which the vehicle body is suspended relative to corresponding ones of the vehicle axles. The closed level control system includes: pressurized medium supply vessel means having first and second pressurized medium spaces for holding a medium under pressure as a pressurized medium; the first and second pressurized medium spaces having no direct connection therebetween; a compressor for transferring the pressurized medium between the pressurized medium supply vessel and the pressurized medium chambers; the compressor having an input and an output; first and second controllable directional valves and each one of the valves having at least two switching states; and, the first controllable directional valve being switchable to connect either the first pressurized medium space or the second pressurized medium space to the compressor input or to the compressor output so that pressurized medium from the pressurized medium chambers can be transferred into the first pressurized medium space or into the second pressurized medium space or pressurized medium from the first pressurized medium space or from the second pressurized medium space can be transferred to the pressurized medium chambers.

The pressurized medium supply vessel is subdivided into a first pressurized medium space and a second pressurized medium space which have no direct connection. Either the first pressurized medium space or the second pressurized medium space can be connected to the compressor input or to the compressor output via at least one common and controllable directional valve so that pressurized medium from the pressurized medium chambers can be transferred into the first or second pressurized medium space or pressurized medium can be transferred from the first or second pressurized medium space into the pressurized medium chambers.

An advantage of the invention is seen in that only very few controllable directional valves are needed whereby space for mounting components and costs are saved. A further advantage of the invention is that the compressor can transfer pressurized medium from the pressurized medium chambers into the pressurized medium spaces and vice versa. In this way, rapid control speeds are achieved when controlling up or controlling down the level control system. A further advantage of the invention is that a higher pressure can be generated in the pressurized medium chambers than the actual compressor end pressure of the compressor because the compressor inducts precompressed pressurized medium from one of the two pressurized medium spaces and can transfer the same into the pressurized medium chambers. The compressor can therefore be dimensioned smaller in order to generate the maximum pressure in the pressurized medium chambers whereby space for mounting components can be saved. A further advantage is that a pressurized medium space subjected to leakage (which then has atmospheric pressure) can still carry out an up-control operation with the pressurized medium in the other pressurized medium space.

According to another feature of the invention, the closed level control system includes at least three controllable directional valves of which each has at least two switching states. The first pressurized air line is switched through with the first controllable directional valve and the second pressurized air line is switched through with the second controllable directional valve and the fourth pressurized air line is blocked by the first controllable directional valve and the third pressurized air line is blocked by the second controllable directional valve when pressurized air is to be transferred from one of the two pressurized medium spaces into a pressurized medium chamber. The first and second controllable directional valves are then in a first switching state.

The third pressurized air line is switched through by the second controllable directional valve and the fourth pressurized air line is switched through by the first controllable directional valve and the first pressurized air line is blocked by the first controllable directional valve and the second pressurized air line is blocked by the second controllable directional valve when pressurized air is to be transferred from a pressurized medium chamber into one of the two pressurized medium spaces. The first and second controllable directional valves are then in a first switching state. A connection of the first controllable directional valve to the first pressurized medium space is established when the third directional valve is in its first switching state and a connection of the first controllable directional valve to the second pressurized medium space is established when the third directional valve is in its second switching state.

The advantage of the above feature is that cost-effective standard directional valves can be used in order to connect the compressor input to the pressurized medium chambers or the compressor output to the pressurized medium supply spaces.

According to another feature of the invention, a check valve is disposed in the first pressurized air line between a common point and the first controllable directional valve with which the first pressurized air line can be switched through. This common point connects the first pressurized air line and the third pressurized air line to the compressor input and the check valve is opening toward the compressor input. A further check valve, which is opening toward the compressor input, lies in the third pressurized air line between the common point and the second controllable directional valve with which the third pressurized air line is switched through.

The advantage of the embodiment of the invention is that, in a specific position of the first and second directional valves, an overflow of pressurized medium from the pressurized medium chambers into the pressurized medium space, which is then switched through by the third directional valve, is not possible and this is independent of whether the air pressure in the pressurized medium chambers is greater or less than the air pressure in the switched-through pressurized medium supply space. In the rest state of the level control system (that is, when no control takes place), the controllable directional valves can, for example, be transferred into this position so that an unintended overflow of pressurized medium between the pressurized medium chambers and the switched-through pressurized medium space cannot take place. Furthermore, in this defined state of the controllable directional valves, a pressure measurement in the pressurized medium chambers is possible in a simple manner with the aid of a pressure sensor.

A further advantage of this embodiment of the invention is that the third controllable directional valve can be so switched into the rest state of the level control system that the pressurized medium space at the higher pressure level (which is preferably higher than the pressure level in the pressurized medium chambers) communicates with the compressor input so that no pressurized air can overflow from the pressurized medium chambers into this pressurized medium space. Preferably, the second controllable directional valve is in its second switch position so that no pressurized medium can overflow from the pressurized medium chambers into the compressor or the air dryer.

According to another feature of the invention, the two pressurized medium spaces are formed by two separate pressurized medium supply vessels. The advantage of this embodiment is that the two pressurized medium supply vessels can be configured smaller and can be accommodated in small pockets for mounting components at different locations in the vehicle.

According to another feature of the invention, the pressurized medium spaces have different pressure levels and therefore at least one low-pressure pressurized medium supply vessel and at least one high-pressure pressurized medium supply vessel are present. An advantage of this embodiment of the invention is that very different control speeds are possible in that the compressor input is connected either to the low-pressure pressurized medium supply vessel or to the high-pressure pressurized medium supply vessel in order to transfer pressurized medium into the pressurized medium chambers or vice versa. Because of the very different pressure levels in the low-pressure pressurized medium supply vessel and the high-pressure pressurized medium supply vessel, quasi automatically different control speeds result. One obtains two further control speed levels when one connects the pressurized medium chambers to the low-pressure pressurized medium supply vessel or to the high-pressure pressurized medium supply vessel without operating the compressor. If one additionally views the control speed levels when one draws air from the atmosphere through the air inlet and compresses the air in the pressurized medium chambers via the compressor or discharges pressurized medium from the pressurized medium chambers into the atmosphere through the outlet, then four control speeds for the up and down control of the level control system are defined in a simple manner.

According to another feature of the invention, the pressure in at least one of the two pressurized medium spaces is higher than the actual maximum compression end pressure of the compressor. An advantage of this feature of the invention is that the compressor can be dimensioned smaller and therefore requires less space for mounting. A further advantage is that other and improved characteristics of the level control system can be achieved with the higher pressure level, such as more rapid control speeds or specific spring rates of the pressurized medium spaces.

According to another feature of the invention, the pressure in at least one of the two pressurized medium spaces can be used for controlling external apparatus especially tire-filling devices and the residual pressure in the other pressurized medium space is available for a level change of the level control system which is to be carried out directly after the external control operation. The advantage of this embodiment is that an especially rapid level control is possible also directly after an external control operation and no standstill time in the form of a compressor cool-down phase is necessary or a filling of a pressurized medium supply vessel with pressurized medium can be carried out in advance of the actual level control. A further advantage of this embodiment of the invention is that external controls can be rapidly carried out from a pressurized medium supply vessel via the compressor.

According to the method of the invention, when filling that pressurized medium space, which is at a higher pressure than the actual compression end pressure of the compressor, the compressor transfers pressurized medium from the pressurized medium chambers into this pressurized medium space. An advantage of this method of the invention is that a higher pressure level is possible in the level control system (especially in at least one of the pressurized medium spaces) without it being necessary to dimension the compressor with respect to size in correspondence to the higher pressure level. In this way, space for mounting components is saved. A further advantage is that, with the higher pressure level, other and improved characteristics of the level control system are obtained, such as more rapid control speeds or specific spring rates of the pressurized medium spaces.

According to another feature of the method of the invention, pressurized medium can be transferred from the air dryer sequentially into the first or second pressurized medium space which has a pressure higher than the actual compression end pressure of the compressor. The compressor sequentially transfers pressurized medium from the second pressurized medium space (which is not to be filled) or from the first pressurized medium space (which is not to be filled) and transfers the same into the air dryer when the first or the second pressurized medium space is not connected to the air dryer, that is, no pressurized medium is transferred from the air dryer into the first or second pressurized medium spaces.

The advantage of the method is that at any time (that is, even during travel when no level control operation is needed or desired), at least one pressurized medium supply vessel can be filled with a pressure which is greater than the compression end pressure of the compressor. The pressurized medium chambers are not filled so that no possibly unwanted level control operation is carried out. In this way, the increase of the level of a vehicle relative to the roadway during highway travel is precluded which, under some circumstances, could change the driving characteristics of the vehicle in an impermissible manner and could lead to an endangerment of the vehicle passengers.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
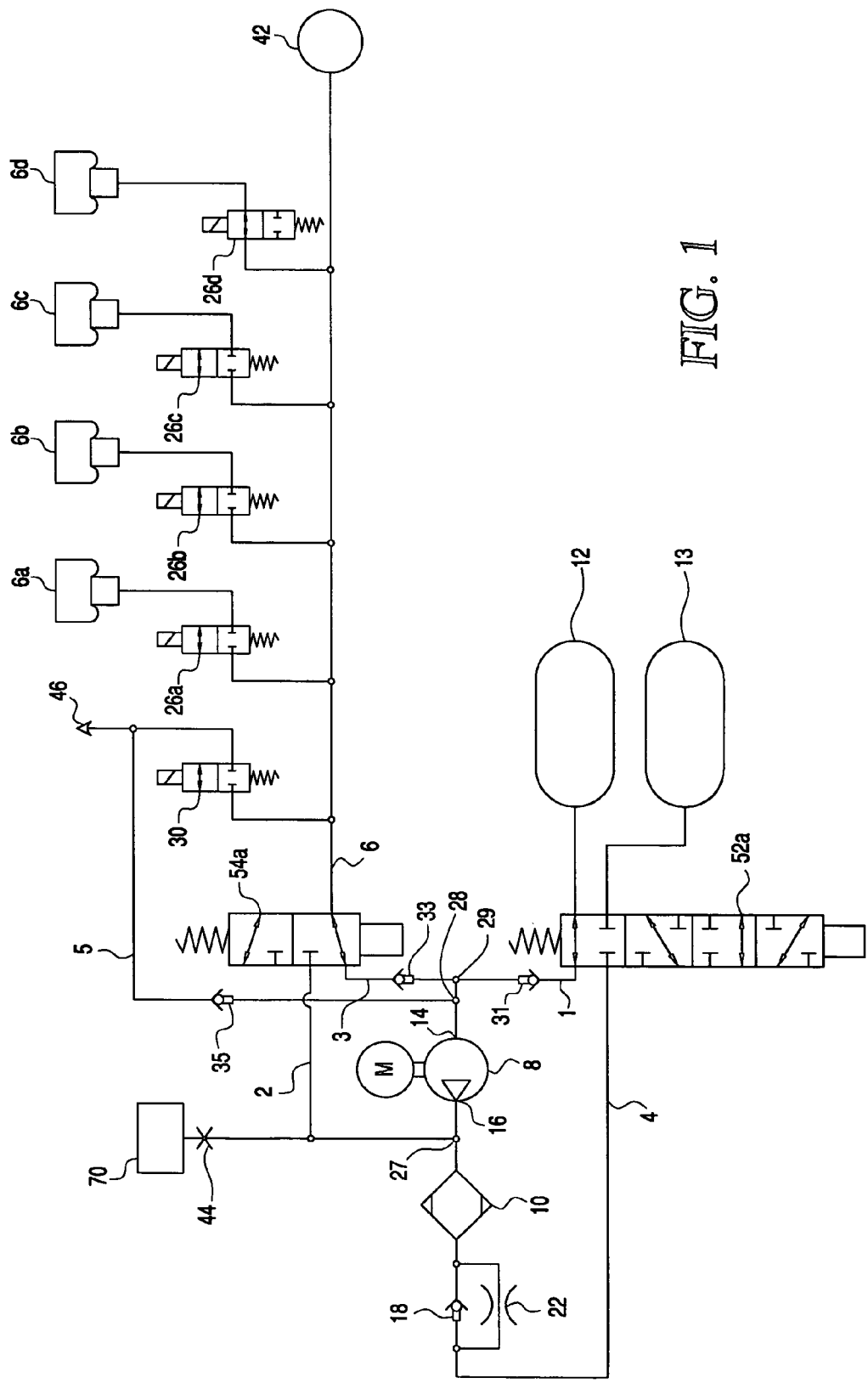
FIG. 1 is a pneumatic schematic diagram of a closed level control system according to a first embodiment of the invention; and, FIG. 2 is a pneumatic schematic diagram of a closed level control system according to a second embodiment of the invention.

FIG. 1 shows a closed level control system which includes: pressurized medium chambers in the form of air springs 6a to 6d, a compressor 8, an air dryer 10 and two pressurized medium supply vessels (12, 13). The first pressurized medium supply vessel 12 and the second pressurized medium supply vessel 13 are alternately connected via a first controllable directional valve 52a via a first pressurized medium line 1 to the compressor input 14 or via a fourth pressurized medium line 4 to the compressor output 16. In a first switch position, the first directional valve 52a connects the first pressurized medium line 1 to the first pressurized medium supply vessel 12 and blocks the fourth pressurized medium line 4 and the second pressurized medium supply vessel 13. In a second switch position, the first directional valve 52a connects the fourth pressurized medium line 4 to the first pressurized medium supply vessel 12 and blocks the first pressurized medium line 1 and the second pressurized medium supply vessel 13. In a third switch position, the first directional valve 52a connects the fourth pressurized medium line 4 to the second pressurized medium supply vessel 13 and blocks the first pressurized medium line 1 and the first pressurized medium supply vessel 12. In a fourth switch position, the first directional valve 52a connects the first pressurized medium line 1 to the second pressurized medium supply vessel 13 and blocks the fourth pressurized medium line 4 and the first pressurized medium supply vessel 12.

An air dryer 10 is mounted in the fourth pressurized medium line 4 between the first directional valve 52a and the compressor output 16. A throttle 22 and a check valve 18 in parallel therewith are mounted between the air dryer 10 and the first directional valve 52a. The check valve 18 is open toward the first directional valve 52a. A second pressurized medium line 2 branches at a point 27 from the fourth pressurized medium line 4 between the compressor output 16 and the air dryer 10. The second pressurized medium line 2 leads to an external apparatus connection 44, which is only open when an external aparatus 70 is connected, and to a second controllable directional valve 54a. In a first switch position, the second directional valve 54a connects the second pressurized medium line 2 to the sixth pressurized medium line S and blocks a connection to the third pressurized medium line 3. In a second switch position of the second directional valve 54a, the sixth pressurized medium line 6 is connected to the third pressurized medium line 3 and the connection to the pressurized medium line 2 is blocked.

The third pressurized medium line 3 is connected to the first pressurized medium line 1 at a common point 29. A check valve 33 lies therebetween and is open to point 29. Likewise, a check valve 31, which is open to point 29, lies between the first directional valve 52a and the point 29. The point 29 is connected via the first pressurized medium line 1 to the compressor input 14. A fifth pressurized medium line 5 branches off at point 28 therebetween. The fifth pressurized medium line 5 or intake line connects the point 28 and the air inlet/air outlet 46. A check valve 35 is mounted therebetween and is open toward the air inlet/air outlet 46. The air inlet/air outlet 46 is further connected to the controllable directional valve 30. In a first switch position of the directional valve 30, a connection between the air inlet/air outlet 46 and the sixth pressurized medium line 6 is blocked and is switched through in a second switch position. A pressure sensor 42 and the controllable directional valves 26a to 26d are connected to the sixth pressurized medium line 6. Directional valves 26a to 26d block a connection to the pressurized medium chambers 6a to 6d in a first position and switch through in a second switch position.

The operation of the level control system of FIG. 1 will now be explained.

The controllable directional valves 26a, 52a and 54a are switched into their second switching state for transferring pressurized medium from the pressurized medium chamber 6a into the first pressurized medium supply vessel 12. The air spring 6a is then connected via the pressurized air line 3 to the compressor input 14. The switched-through directional valves 26a and 54a and the check valve 33 lie in the pressurized air line 3. The compressor output 16 is connected via the pressurized air line 4 wherein the air dryer 10, the check valve 18 and the switched-through directional valve 52a lie. Accordingly, and starting from the air spring 6a, the air can be transferred with the aid of the compressor 8 into the pressurized medium supply vessel 12. During this operation, the pressurized air line 2 is blocked by the controllable directional valve 54a and the pressurized air line 1 as well as the pressurized medium supply vessel 13 is blocked by the controllable directional valve 52a. For ending the operation, at least the controllable directional valve 26a is again transferred into the first switching state. For the air springs 6b to 6d, the same procedure is followed with the difference that the controllable directional valves 26b to 26d assume corresponding switch positions. The same applies to the second pressurized medium supply vessel 13. The first directional valve 52a is then transferred into the third switch position.

To transfer pressurized air from the first pressurized medium supply vessel 12 into the pressurized medium chamber 6a, the controllable directional valve 26a is first switched into the first switching state. The directional valves 52a and 54a remain in the first switch position. The first pressurized medium supply vessel 12 is then connected to the compressor input 14 via the pressurized air line 1 in which the controllable directional valve 52a and the check valve 31 lie. The compressor output 16 is connected to the air spring 6a via the pressurized medium line 2 in which the controllable directional valve 54a and the through-switched controllable directional valve 26a lie. Accordingly, pressurized medium can be transferred from the pressurized medium supply vessel 12 via the compressor 8 into the pressurized medium chamber 6a. During this operation, the pressurized medium line 3 is blocked by the controllable directional valve 54a and the pressurized air line 4 and the pressurized medium supply vessel 13 are blocked by the controllable directional valve 52a. To end this operation, at least the controllable directional valve 26a is again transferred into its first switching state. The air springs 6b to 6d are filled with pressurized medium from the pressurized medium supply vessel 12 in the same manner. The same applies to the second pressurized medium supply vessel 13. The first directional valve 52a is then transferred into the fourth switch position.

To fill the first pressurized medium supply vessel 12 with air from the atmosphere, the controllable directional valves 30, 52a and 54a are transferred into the second switching state. The atmosphere is then connected to the compressor input 14 via the controllable directional valve 30, the controllable directional valve 54a and the check valve 33. The compressor output 16 is connected to the pressurized medium supply vessel 12 via the pressurized medium line 4 wherein the air dryer 10, the check valve 18 and the through-switched controllable directional valve 52a lie, so that a filling of the pressurized medium supply vessel 12 is possible with air from the atmosphere with the aid of the compressor 8. During this operation, the pressurized air line 2 is blocked by the controllable directional valve 54a and the pressurized medium line 1 as well as the pressurized medium supply vessel 13 are blocked by the controllable directional valve 52a. To end this operation, at least the controllable directional valve 30 is again transferred into the first switching state. Likewise, a drawing of air from the atmosphere to the compressor input 14 is possible via the fifth pressurized medium line 5 and the check valve 35. The fifth pressurized medium line 5 is connected to the air input/air output 46. Then, only the first directional valve 52a in the second switch position connects the fourth pressurized medium line to the pressurized medium supply vessel 12. The same applies to the second pressurized medium supply vessel 13. The first directional valve 52a is then transferred into the third switch position.

For discharging pressurized air from the pressurized medium supply vessel 12 into the atmosphere, the controllable directional valves 52a and 30 are first transferred into the second switching state. The first pressurized medium supply vessel 12 is then connected to the atmosphere via the controllable directional valve 52a, the throttle 22, the air dryer 10, the controllable directional valve 54a and the controllable directional valve 30 so that pressurized medium from the first pressurized air supply vessel 12 can flow into the atmosphere. Here, the pressurized air is expanded via the throttle and is conducted through the air dryer 10 in the opposite direction so that the air dryer 10 can be regenerated. The same applies to the second pressurized medium supply vessel 13. The first directional valve 52a is then transferred into the third switch position.

As shown above, pressurized medium can be exchanged between the pressurized medium supply vessels (12, 13) and the pressurized medium chambers 6a to 6d via the compressor 8. Furthermore, and in accordance with the invention, it is possible to generate a higher pressure level in the pressurized medium supply vessels (12, 13) with the level control system of the invention than the actual compression end pressure which is dependent upon the theoretical compression ratio less the compression losses. For example, the compressor 8 can have a theoretical compression ratio of twenty. An actual compression end pressure of approximately 18 bar is reached when the compression losses such as non-tightness and thermal losses are deducted. This notwithstanding, it is possible with this compressor 8 in the level control system of the invention to generate, for example, a pressure of approximately 30 bar in one of the two pressurized medium supply vessels (12, 13).

The high pressure level is reached in the corresponding pressurized medium supply vessel (12, 13) in that, for example, the pressurized medium supply vessels (12, 13) are prefilled with air pressurized by the compressor 8 up to the maximum possible compression end pressure of the compressor 8. This compressed air is drawn from the atmosphere via the air inlet/air outlet 46. This precompressed pressurized air is transferred into one or several pressurized medium chambers 6a to 6d and is further compressed so that the pressure level increases further and, if required, increases above the maximum compression end pressure of the compressor 8. This pressurized air is transferred from one or more of the corresponding pressurized medium chambers 6a to 6d by the compressor 8 into a pressurized medium supply vessel (12, 13) which is already prefilled so that the pressure in this pressurized medium supply vessel (12, 13) lies above the maximum compression end pressure of the compressor 8 at the end of the compression operation. A compressor which reaches this high maximum compression end pressure of, for example, 30 bar in a one-stage or multi-stage compression would be significantly larger and more complex to build compared to the compressor 8 utilized.

The above descriptions show that the functions of the level control system are not affected by the check valves 31 and 33. The above-mentioned functions of the level control system include: transfer of pressurized air from the air springs 6a to 6d into one of the two pressurized medium supply vessels (12, 13); transfer of pressurized air from one of the two pressurized medium supply vessels (12, 13) into the air springs 6a to 6d; filling one of the two pressurized medium supply vessels (12, 13) with air from the atmosphere; discharge of pressurized air from one of the two pressurized medium supply vessels (12, 13) via the air dryer 10 into the atmosphere.

In the following, it will be explained how the air pressure in the pressurized medium chambers 6a to 6d can be measured with the aid of the pressure sensor 42.

During the pressure measurement, an air exchange between the pressurized medium chambers 6a to 6d and the pressurized medium supply vessels (12, 13) should be avoided in order to prevent an unintended dropping or raising of the vehicle body (60). Accordingly, during pressure measurement, it should be avoided that pressurized air flows over from the pressurized medium chambers 6a to 6d into one of the two pressurized medium supply vessels 12 or 13 (this could happen when the air pressure in the pressurized medium chamber 6a to 6d, which is to be measured, is greater than the air pressure in the corresponding pressurized medium supply vessel 12 or 13). It is likewise to be avoided that, during the pressure measurement, pressurized air flows over from one of the two pressurized medium supply vessels 12 or 13 into the pressurized medium chambers 6a to 6d whose air pressure is measured (this could happen when the pressurized air in the pressurized medium chambers 6a to 6d, which are to be measured, is less than in the corresponding pressurized medium supply vessel 12 or 13). Before the pressure measurement, it is not known whether the air pressure in the pressurized medium chamber 6a to 6d, which is to be measured, is greater or less than in the corresponding pressurized medium supply vessel 12 or 13. For this reason, a position of the controllable directional valves 52a and 54a must be set with which both possible cases can be effectively suppressed independently of the pressure conditions. This is ensured by the position (shown in FIG. 1) of the controllable directional valve 52a (first switch position) and 54a (second switch position) as will now be explained. The controllable directional valve 52a connects the first pressurized medium line 1 to the pressurized medium supply vessel 12 and blocks the pressurized air line 4 as well as the pressurized medium supply vessel 13 and the controllable directional valve 54a connects the third pressurized medium line 3 to the sixth pressurized medium line 6 and blocks the second pressurized medium line 2.

In the following, the pressure measurement in one of the pressurized medium chambers 6a to 6d is explained by way of example with reference to the pressurized medium chamber 6a. For measuring the air pressure, the controllable directional valve 26a is transferred into the second switch position so that the pressurized medium chamber 6a is connected to the pressure sensor 42 via the controllable directional valve 26a and the air pressure can be measured with the aid of this sensor. When the air pressure in the pressurized medium chamber 6a is greater than the air pressure in the first pressurized medium supply vessel 12, then, nonetheless, no pressurized air can flow from the pressurized medium chamber 6a into the first pressurized medium supply vessel 12. The air from the pressurized medium chamber 6a reaches the check valve 31 via the controllable directional valves 26a and 54a and the check valve 33. The check valve 31, however, blocks toward the controllable directional valve 52a. In this way, the pressurized air extends only up to the check valve 31 but not to the controllable directional valve 52a and the first pressurized medium supply vessel 12. An overflow of pressurized air from the pressurized medium chamber 6a into the first pressurized medium supply vessel 12 via another way is likewise not possible because the pressurized air lines 2 and 4 are interrupted by the controllable directional valves 54a and 52a. The same applies to the second pressurized medium supply vessel 13. The first directional valve 52a is then transferred into the fourth switch position.

If, in contrast, the air pressure in the first pressurized medium supply vessel 12 is greater than the air pressure in the pressurized medium chamber 6a, then it is likewise not possible that the pressurized air flows from the supply vessel 12 into the pressurized medium chamber 6a. In this case, and starting from the first pressurized medium supply vessel 12, the air can reach only up to the check valve 33 via the controllable directional valve 52a and the check valve 31. The check valve 33 blocks toward the controllable directional valve 54a and the air spring 6a. An overflow of pressurized air from the first pressurized medium supply vessel 12 into the pressurized medium chamber 6a via another path is likewise not possible because the pressurized air line 4 is interrupted by the directional valve 52a and the pressurized air line 2 is interrupted by the directional valve 54a. The same applies to the second pressurized medium supply vessel 13. The first directional valve 52a is then transferred into the fourth switch position.

For ending the pressure measurement, the controllable directional valve 26a is again transferred into the first switch state. In a corresponding manner, the air pressure in the pressurized medium chambers 6b to 6d is measured. The corresponding directional valve 26b to 26d is then transferred into the second switch position from the first switch position shown in FIG. 1. The first controllable directional valve 52a in FIG. 1 includes four switch positions and can be configured as a standard level control valve with two movable switch pistons and an actuating device.

Figure 2:
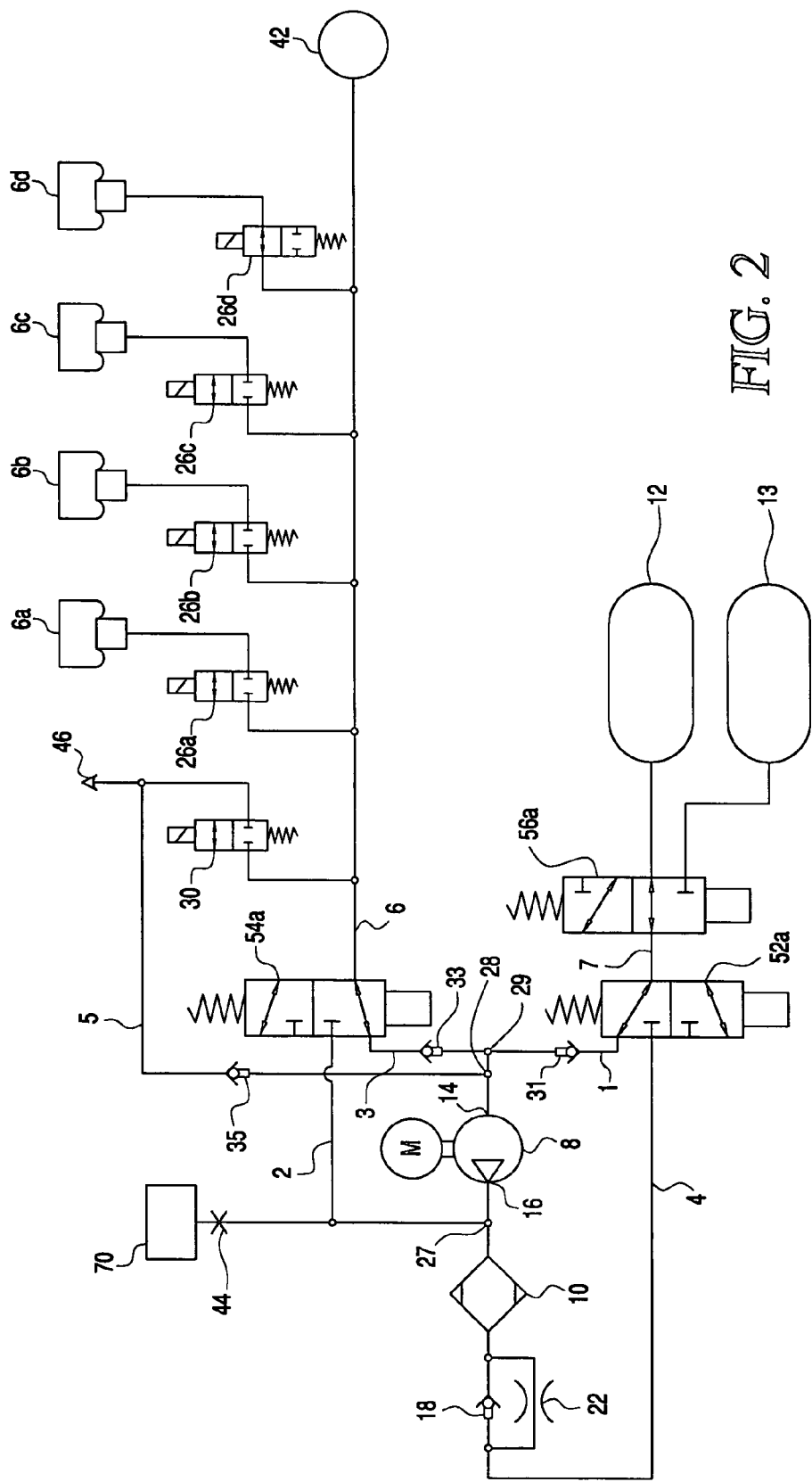
Figure 3:
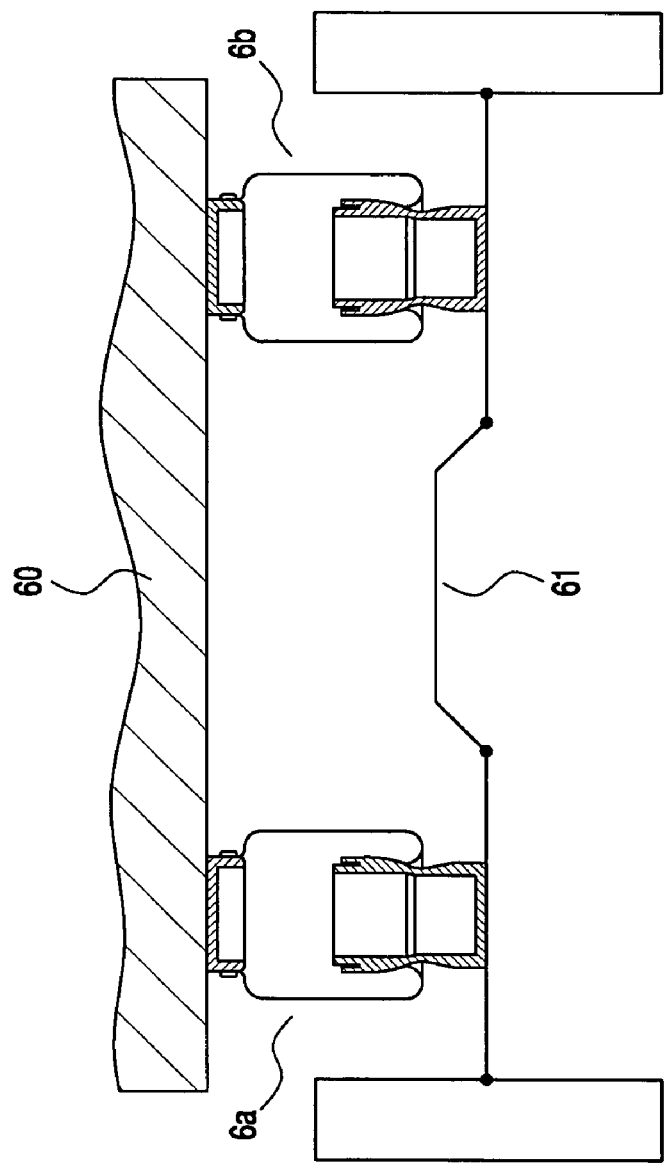
FIG. 3 is a schematic diagram of two air springs (6a, 6b) suspended between a vehicle body (60) and a vehicle axle (61).

FIG. 2 shows a closed level control system which substantially corresponds to the level control system shown in FIG. 1. Operationally, the level control systems shown in FIGS. 1 and 2 do not differ. In FIG. 2, the first controllable directional valve 52a is configured as a 3/2-directional valve which, in a first switch position, connects the first pressurized medium line 1 to a seventh pressurized medium line 7 and blocks the fourth pressurized medium line 4. In the second switch position, the first controllable directional valve 52a connects the fourth pressurized medium line 4 to the seventh pressurized medium line 7 and blocks the first pressurized medium line 1. The seventh pressurized medium line 7 is connected to the second pressurized medium supply vessel 13 via a third controllable directional valve 56a in a first switch position and blocks a connection to the first pressurized medium supply vessel 12. In a second switch position, the third controllable directional valve 56a is connected to the first pressurized medium supply vessel 12 and blocks a connection to the second pressurized medium supply vessel 13. In correspondence to the above-described switch positions of the two controllable directional valves 52a and 56a in FIG. 2, all functions described with respect to FIG. 1 can be carried out with the level control system of FIG. 2.

It is understood that the foregoing description is that of the preferred embodiments of the invention and that various changes and modifications may be made thereto without departing from the spirit and scope of the invention as defined in the appended claims.

What is claimed is:
1. A closed level control system for a vehicle having a vehicle body, vehicle axles and pressurized medium chambers with which the vehicle body is suspended relative to corresponding ones of said vehicle axles, the closed level control system comprising:
   pressurized medium supply vessel means having first and second pressurized medium spaces for holding a medium under pressure as a pressurized medium;
   said first and second pressurized medium spaces having no direct connection therebetween;
   a compressor for transferring said pressurized medium between said pressurized medium supply vessel means and said pressurized medium chambers;
   said compressor having an input and an output;

first and second controllable directional valves and each one of said valves having at least two switching states comprising a first and a second switching state;

said first controllable directional valve being switchable to connect either said first pressurized medium space or said second pressurized medium space to said compressor input or to said compressor output so that pressurized medium from said pressurized medium chambers can be transferred into said first pressurized medium space or into said second pressurized medium space or pressurized medium from said first pressurized medium space or from said second pressurized medium space can be transferred to said pressurized medium chambers;

wherein said pressurized medium is pressurized air and said system further comprises:

a first pressurized air line connecting said first controllable directional valve to said input of said compressor;

a second pressurized air line connecting said output of said compressor to said second controllable directional valve;

a third pressurized air line connecting said input of said compressor to said second controllable directional valve;

a fourth pressurized air line connecting said output of said compressor to said first controllable directional valve;

said pressurized medium chambers being connected to said second controllable directional valve;

said first pressurized air line being switched through by said first controllable directional valve in said first switching state thereof and said second pressurized air line being switched through by said second controllable directional valve in said first switching state thereof and said fourth pressurized air line being blocked by said first controllable directional valve in said first switching state thereof and said third pressurized air line being blocked by said second controllable directional valve in said first switching state thereof when pressurized air is transferred from one of said first and second pressurized medium spaces into one of said pressurized medium chambers;

said third pressurized air line being switched through by said second controllable directional valve in said second switching state thereof and said fourth pressurized air line being switched through by said first controllable directional valve in said second switching state thereof and said first pressurized air line being blocked by said first controllable directional valve in said second switching state thereof and said second pressurized air line being blocked by said second controllable directional valve in said second switching state thereof wherein pressurized air is transferred from one of said pressurized medium chambers into one of said first and second pressurized medium spaces;

a third controllable directional valve interposed between said first controllable directional valve and said pressurized medium spaces and said third controllable directional valve likewise having at least two switching states comprising a first and a second switching state;

said third controllable directional valve being switched into said first switching state thereof to provide a connection from said first controllable direction valve to said first pressurized medium space and to block a connection to said second pressurized medium space; and, said third controllable directional valve being switched into said second switching state thereof to provide a connection from said first controllable directional valve to said second pressurized medium space and to block a connection to said first pressurized medium space.

2. The closed level control system of claim 1, wherein said first pressurized air line and said third pressurized air line conjointly define a common connecting point; and, wherein said closed level control system further comprises:

a first check valve mounted in said first pressurized air line between said common connecting point and said first controllable directional valve and said first check valve being disposed so as to be open toward said input of said compressor; and, a second check valve mounted in said third pressurized air line between said common connecting point and said second controllable directional valve and said second check valve being open toward said input of said compressor.

3. The closed level control system of claim 1, wherein said first and second pressurized medium spaces of said pressurized medium supply vessel means are separate first and second pressurized medium supply vessels.

4. The closed level control system of claim 1, wherein said first and second pressurized medium spaces have different pressure levels.

5. The closed level control system of claim 1, wherein the pressure in at least one of said first and second pressurized medium spaces is greater than the maximum actual compression end pressure of said compressor.

6. The closed level control system of claim 1, further comprising an additional air line connected into one of said pressurized airlines of said system to facilitate control of an external apparatus utilizing the pressure in at least one of said first and second pressurized medium spaces; and, the residual pressure in the other one of said pressurized medium spaces being available to execute a level change of said level control system directly after an external control operation.

7. The closed level control system of claim 6, wherein said external apparatus is a tire inflating device.

8. The closed level control system of claim 1, further comprising:

an air dryer mounted in said fourth pressurized air line;

an air inlet/air outlet;

an intake line ending at said air inlet/air outlet and connecting said input of said compressor to the atmosphere via said air inlet/air outlet;

an additional controllable directional valve switchable between a base position wherein no throughflow is permitted and a switched position wherein throughflow is permitted to said air inlet/air outlet;

said second pressurized line branching off from said fourth pressurized air line at a branch point between said output of said compressor and said air dryer and ending at said additional controllable directional valve; and, said pressurized medium supply vessel means being connectable to the atmosphere via said air dryer and said second pressurized line when said additional controllable directional valve is in said switched position thereof.

* * * * *